Figure 1:
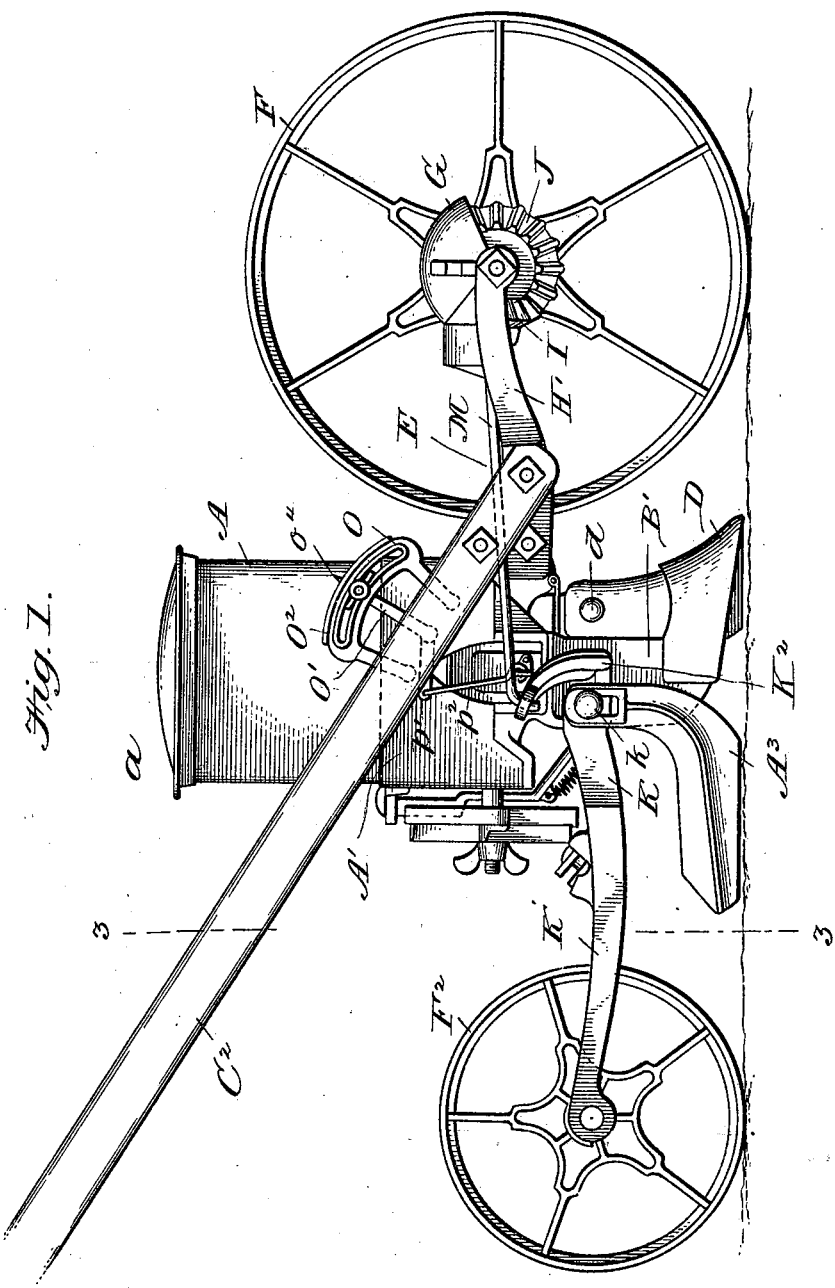

No. 664,072. Patented Dec. 18, 1900.
S. L. ALLEN.
SEED PLANTER.
(Application filed July 3, 1899.)

(No Model.) 6 Sheets—Sheet 1.

Witnesses.
Jno. T. Cross
J. Henderson.

Inventor,
Samuel L. Allen,
by Ame Pettit,
his Attorney.

THE NORRIS PETERS CO., PHOTO-LITHO., WASHINGTON, D. C.

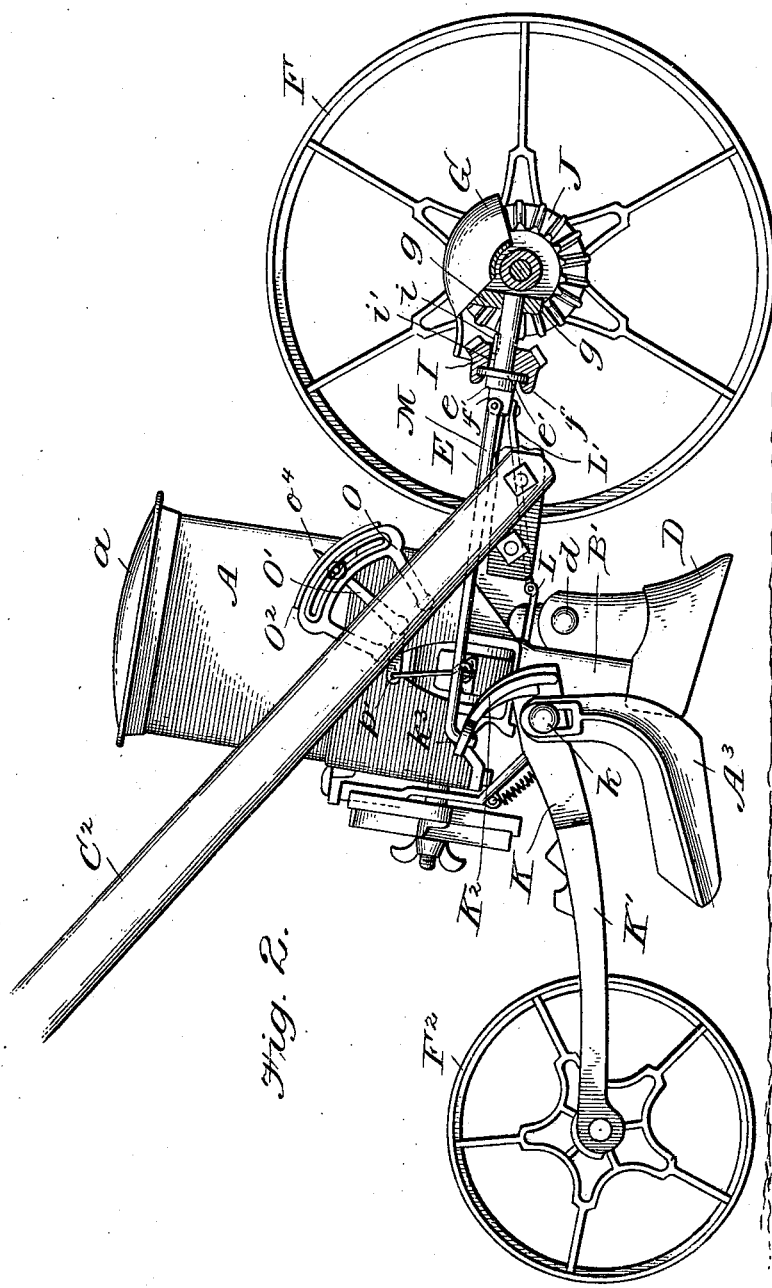

No. 664,072. Patented Dec. 18, 1900.
S. L. ALLEN.
SEED PLANTER.
(Application filed July 3, 1899.)

(No Model.) 6 Sheets—Sheet 3.

Witnesses.
Jno. T. Cross
J. Henderson

Inventor,
Samuel L. Allen,
by / Ame. Petit,
his Attorney.

THE NORRIS PETERS CO., PHOTO-LITHO., WASHINGTON, D. C.

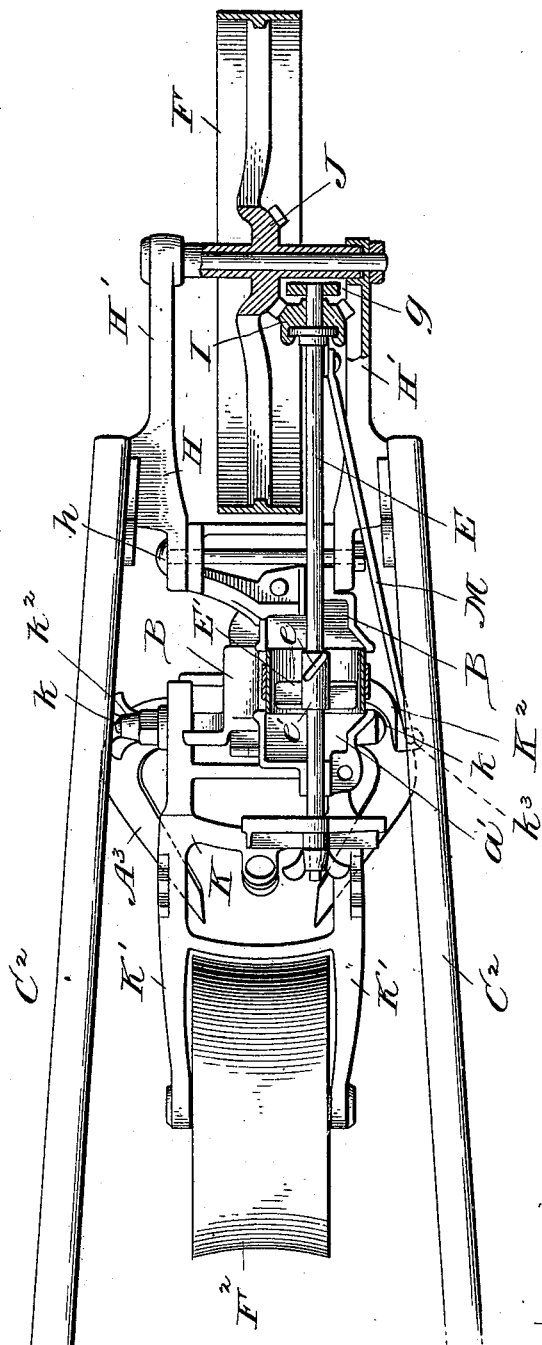

No. 664,072. Patented Dec. 18, 1900.
S. L. ALLEN.
SEED PLANTER.
(Application filed July 3, 1899.)
(No Model.) 6 Sheets—Sheet 5.

Witnesses.
Jno. T. Cross
J. Henderson

Inventor;
Samuel L. Allen,
by Horace Pettit
Attorney.

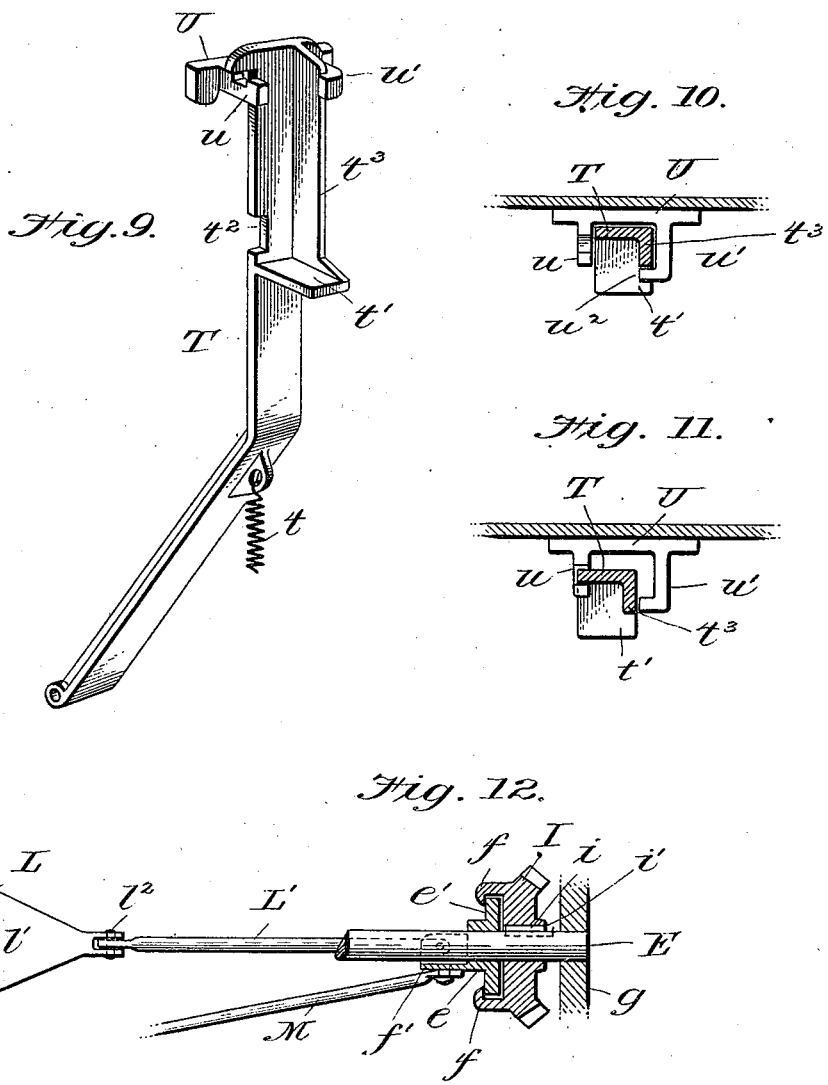

UNITED STATES PATENT OFFICE.

SAMUEL L. ALLEN, OF MOORESTOWN, NEW JERSEY.

SEED-PLANTER.

SPECIFICATION forming part of Letters Patent No. 664,072, dated December 18, 1900.

Application filed July 3, 1899. Serial No. 722,663. (No model.)

*To all whom it may concern:*

Be it known that I, SAMUEL L. ALLEN, a citizen of the United States, and a resident of Moorestown, State of New Jersey, have invented certain new and useful Improvements in Seed-Distributing Machines, of which the following is a full, clear, and exact description, reference being had to the accompanying drawings, forming part of this specification.

My invention relates to certain improvements in agricultural implements, and more particularly to that class known as "seed-distributers," in which the seed may be distributed in a continuous stream, known as "drills," or in hills, where it is dropped alternately in predetermined quantities.

One object of my invention is to provide an improved construction of feed-cylinder operating in conjunction with an improved form of index, whereby the adjustment of the hopper-opening can be readily effected to accommodate the various kinds of seeds.

A further object of my invention is to provide an improved construction of shutter for automatically opening and closing the discharge-chute when the machine is used as a hill-dropper; also, in providing the shutter mechanism with an improved means for holding the said shutter open permanently, so that the seed may be deposited continuously, as in drilling.

Another object of my invention is to provide an improved means for disconnecting the feeding and dropping mechanism from its actuating mechanism, so that the machine may be moved either backward or forward without operating these parts; also, in providing an automatic cut-off for the seed-hopper, whereby the discharge-opening of the said hopper is entirely closed when the feeding and dropping mechanism is disconnected from its actuating mechanism.

Further objects of my invention are to provide an improved form of frame for machines of this character constructed in two parts, so that the seed-distributing portion of the machine may be disconnected from the wheel-supporting frame and handle-bars, and this latter section may be connected with a tool-holding frame and used as a cultivator or other implement; also, in generally improving, simplifying, and cheapening the construction of this class of machines, as will be more fully described hereinafter.

Figure 4:
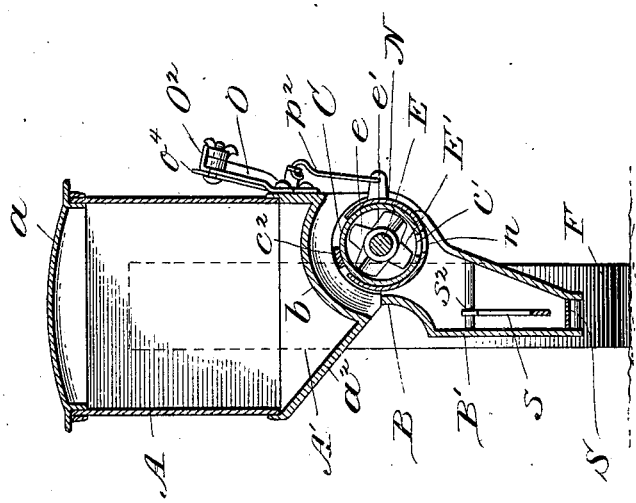
Figure 3:
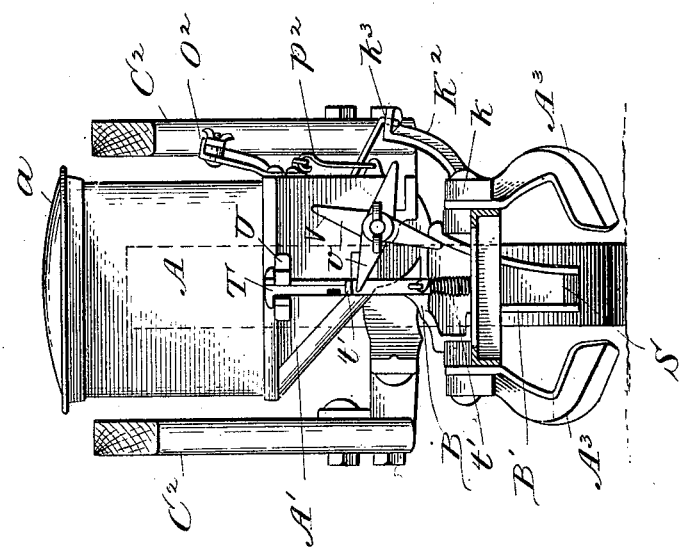
Figure 6:
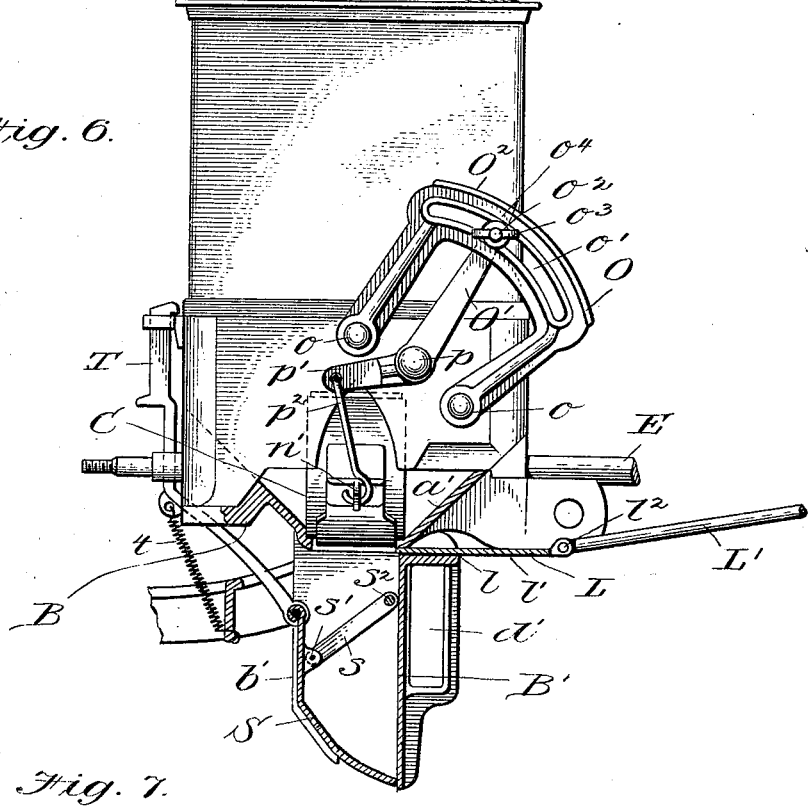
Figure 7:
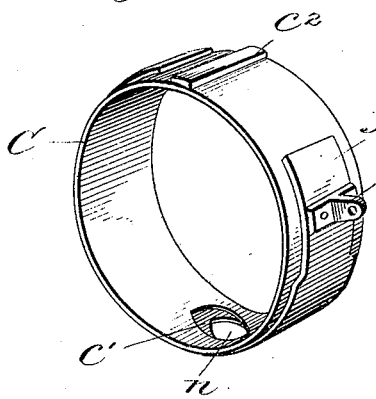
Figure 8:
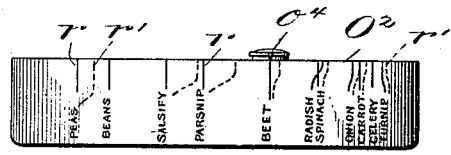

In the accompanying drawings, which form a part of this specification, and in which similar letters of reference are used to indicate similar parts, Figure 1 is a side elevation of a complete machine embodying my improvements. Fig. 2 is a similar view to Fig. 1, showing the rear end of the machine as elevated and illustrating the automatic disconnection of the feeding and dropping actuating mechanism. Fig. 3 is a sectional end elevation taken about on the line 3 3 of Fig. 1. Fig. 4 is a vertical section taken transversely through the seed-hopper, feed-cylinder, and discharge-chute. Fig. 5 is a plan view with the upper portion of the seed-hopper removed, the front driving-wheel and its connecting-gearing being shown in section, and the feed-cylinder and its slide also being shown in section. Fig. 6 is a detail view in elevation and section of the seed-hopper and its discharge-chute, illustrating the shutter mechanism; also, illustrating the feed-cylinder, its cut-off, and the index for regulating the same. Fig. 7 is an enlarged detail perspective view of the feed-cylinder and its sliding cut-off band. Fig. 8 is an enlarged plan view of the inside segment. Fig. 9 is a detail perspective of the catch-lever for actuating the shutter mechanism. Fig. 10 is a detail sectional view illustrating the bracket in which the catch-lever is guided and which supports said lever when the machine is used as a drill. Fig. 11 is a similar view showing the position of the catch-lever when raised and supported by the bracket. Fig. 12 is a sectional detail illustrating the sliding gate for the discharge-opening of the seed-hopper.

In the said drawings, A represents the seed-hopper, provided at its top with the usual form of cover, as $a$, which is opened for the introduction of the seed. The central portion A' of the hopper is formed, preferably, of cast metal and has the sloping ends $a'$ and a sloping side $a^2$ and near its bottom an arch $b$, preferably cast in one piece with the hopper-section A' and extending across from one side to the other, as illustrated most clearly in Fig. 4 of the drawings. This arch is of conical section with the apex upward and forms a hip-roof cover for the feed-cylinder C, which is fitted in the apex of the hopper. The casting B, which forms the central frame of the machine, also forms the lower end of the hopper A, as shown more clearly in Fig. 6 of the drawings, and this section B has cast integral therewith the depending discharge-chute B', through which the seeds are automatically discharged, as will be hereinafter described. The furrow-opener D is adjustably secured by means of the bolt $d$ through the slotted portion $d'$, formed on the front face of the discharge-chute B'.

The feed-cylinder C is open at both ends and has running through its center a longitudinal shaft E, which carries the feed-wheel E', having the four radially-projecting inclined blades $e$, formed integrally with a hub $e'$, which is rigidly secured on the shaft E. These blades $e$ are set in pairs which are at right angles to each other and set obliquely thereon, as illustrated in Fig. 4 of the drawings. When the shaft E revolves, the action of the wheels is similar to that of a propeller-wheel and feeds the seed to the opening $c'$, provided in the lower portion of the feed-cylinder C, from which it is delivered into the discharge-chute B', as will be hereinafter more fully described. The shaft E, which carries the feed-wheel E', is mounted in bearings provided in the castings A' B, extends forward, and has its forward end journaled in the casting $g$, which is formed integral with the gear-cover G, which is cast integral with the forward arm H' of the wheel-supporting frame H. Loosely mounted on the forward ends of the shaft E and feathered thereto is the bevel-gear I, adapted to mesh with the bevel-gear J, formed integral with the driving-wheel F. The gear-covering G is adapted to cover the gears I and J and is formed integral with one of the arms H' of the wheel-supporting frame, as heretofore described. As the machine travels forward motion is transmitted through the medium of the driving-wheel F and its gear J and the intermeshing gear I to the shaft E, which carries the feed-wheel E', located in the feed-cylinder C, heretofore described.

To the rear end of the casting B is pivotally secured, by means of the bolts $k$, a rearwardly-extending frame K, having the arms K', which carry between them the roller F$^2$. To the forward part of the frame K are secured the downwardly-projecting covering-blades A$^3$ by means of the bolt $k$, which also pivotally secures the said frame K to the frame-section B, the thumb-nut $k^2$ being provided on one end of this bolt $k$ for the purpose of securely holding the said blades to the frame K. On one side of the frame K and formed integral therewith is an upwardly-extending arm K$^2$, and in the upper end of this arm K$^2$ is formed an eye $k^3$, into which is secured the rear end of a rod M, which is secured at its forward end to the sliding gear I in the manner illustrated, which will now be described.

The gear I, as before stated, is loosely mounted on the shaft E and adapted to turn therewith by means of the feather $i$, which is carried by the shaft E, engaging a slot $i'$, provided on the periphery of the central opening of the gear, which construction permits of its being slid on the said shaft E. In the rear of the gear I and loosely mounted on the shaft E is a collar $e$, provided with a flange $e'$, which bears against the rear side of the gear and is engaged by the overlapping projections $f$. A projection $f'$ extends rearwardly from the said collar $e$ on one side of the said shaft E, to which is pivotally secured the forward end of the rod M. Thus as the rear portion of the machine is raised by means of the handle-bars C$^2$, as illustrated in Fig. 2 of the drawings, the pivoted frame K, carrying the roller F$^2$, will drop by gravity, swinging from its pivot $k$, which movement throws up the arm K$^2$, to which is secured one end of the rod M, thereby pulling the said rod M in a backward direction and drawing the bevel-gear I away from and out of mesh with the driving-gear J on the wheel F, thus disconnecting the feeding and dropping mechanism contained in the hopper A. Upon lowering the machine to its normal position, as illustrated in Fig. 1 of the drawings, the roller F$^2$ comes in contact with the ground, which throws the pivoted frame K back into the position illustrated in Fig. 1, thereby throwing the rod M forward and sliding the gear I into engagement with the gear J of the driving-wheel F, which again throws the actuating mechanism in the hopper into operation.

The feed-cylinder C, which has been heretofore described, is held in its position in the apex of the hopper A by the two sections A' and B, the conical hip-roof $b$ being located directly above the same and impinging and bearing on the upper periphery thereof. These two sections being tightly fitted and bolted together hold the said feed-cylinder C in a rigid position. Embracing the outer periphery of the feed-cylinder is a metallic spring-band N. (Illustrated in Figs. 4 and 7 of the drawings.) This spring-band N is provided with an opening $n$, adapted to register at times with the opening $c'$, provided in the cylinder C. The band N does not extend entirely around the cylinder C, but is open at its top, as illustrated in Fig. 7 of the drawings, so that it may be capable of sliding on said band by means of its connection with the index-finger of the index-segment O, which will be described hereinafter. On the upper outer surface or periphery of the cylinder C is a strip $c^2$, which serves as a stop to limit the sliding movement of the band N when it is moved by the index-finger O' to regulate the size of the cut-off in the bottom of the feed-cylinder.

The segment O is secured outside of the hopper by means of suitable bolts or rivets $o$ and is provided with a slot $o'$, through which passes the bolt $o^2$, which secures the upper end of the index-finger O' to the said segment, the thumb-nut $o^3$ being used for tightening and holding the said index-finger at a fixed point. The index-finger O' is pivoted at $p$ to the outside of the hub about midway between the rivets $o$ and has a crank-arm $p'$ formed integral therewith and illustrated most clearly in Fig. 6 of the drawings. A link $p^2$ connects the crank $p'$ with a projecting lug $n'$, formed on the band N. On the upper edge of the segment-plate O is secured an index-plate $O^2$, having marked thereon the character of the seeds to be used in this class of machine, and the graduations $r$ (shown in full lines directly opposite the name of the particular kind of seed) designate the point to which the pointed end $o^4$ of the index-finger must be set for sowing these particular seeds in drills, while the dotted lines $r'$ designate the set point for sowing in hills. Thus as the index-finger O' is adjusted to point out a particular kind of seed the band N is adjusted, by means of its connection with the said index-finger, to regulate the area of the opening $n$, formed in the said band and cylinder C, heretofore described. The revolving feed-wheel E', located inside of the feed-cylinder, agitates the seed and forces them through the cylinder over the discharge-apertures $c'$ and $n$, through which they are discharged into the chute B'. The discharge-chute B' is formed integral with the casting B, having three solid walls and the open rear portion, as $b'$. The open rear portion $b'$, also the bottom portion of the chute, is closed by means of the shutter S, which is pivotally supported to the sides of the chute by means of the link $s$, pivoted to the shutter at $s'$ and to the side walls of the chute at $s^2$. The upper end of the shutter S is pivotally connected to the catch-lever T, which is supported by and slides in the lug U, rigidly formed on the rear side of the hopper-section A'. A coiled spring $t$ is secured at one end to the lever T and at its other end to a portion K of the machine, said spring serving to normally keep the shutter S in a closed position, as illustrated in Fig. 6 of the drawings.

On the rear end of the shaft E, I secure the spacing-wheel V, having a series of arms, as $v$, adapted to engage the projection $t'$, formed on the catch-lever T, and raise the said catch-lever, and thereby open the shutter S as the said shaft E revolves, thus depositing the seeds which have been fed into the discharge-chute at certain intervals along the ground, the distances between the hills in which the seeds are deposited being determined by the number of arms on the spacing-wheel V, in this instance shown as four in number, which will deposit four quantities of seed at one revolution of the shaft E. These wheels may be made with as many arms as desirable, according to the distances required between the hills.

When it is desired to sow the seed in drills, the catch-lever T is moved upward until the slot $t^2$ registers with one of the arms $u$, formed on the lug U, when it is then thrown over to one side until the said slot or notch $t^2$ engages the arm $u$. A rib $t^3$ is provided on the rear face of the lever T, (see Fig. 9 of the drawings,) which is adapted to enter the opening $u^2$, formed between the two arms $u$ $u'$, when the said lever T is raised and held in this raised position by means of the notch $t^2$, engaging the arm $u$. This is accomplished by throwing the said lever T upward in the position illustrated in Fig. 11 of the drawings. When in this position, the lever is securely held in its raised position without danger of its being thrown out of engagement with the arm $u$ by reason of the jostling or shaking of the machine during its operation, and the lug $t'$ of the said lever is held out of the path of the revolving spacing-wheels V, and the shutter S is held open, thereby allowing the seed to fall through the discharge-chute in a continuous stream, thus sowing the seed in drills.

When the rear portion of the machine is elevated to disconnect the feeding and dropping mechanism, as heretofore described, it is necessary to provide means for automatically closing the discharge-opening in the bottom of the feed-cylinder C, so as to prevent the escape of any seed. I accomplish this by providing a sliding gate L, concaved slightly, so as to conform to the shape of the cylinder C, and adapted when in a closed position to bear against the lower surface of the band N of the cylinder C and close the opening $n$. An arc slot $l$ is formed in the rear wall of the discharge-chute B', in which the gate L is supported and adapted to slide. The front portion $l'$ of the gate extends forward and is pivotally connected at $l^2$ to a rod L', the said rod $l'$ being connected at its forward end to the projection $f'$ of the collar $e$. Thus as the machine is elevated to disconnect the driving mechanism by sliding the gear I in a rearward direction in the manner heretofore described the rod L' will be simultaneously actuated to slide the gate L in a rearward direction and close the opening between the seed-hopper and the discharge-chute B'. When the machine is lowered and the driving mechanism again connected, the gate L will be withdrawn by the rod L', thereby leaving the hopper open and free to discharge the seed.

The section H of the frame of the machine comprises the two arms H', in which is journaled the driving-wheel F and to the rear sides of which are secured the handle-bars $C^2$. The casting B, which forms the lower section of the hopper-frame, is bolted to the section H by means of the bolt $h$, and the entire rear portion of the machine may be removed from the wheel-supporting frame and handle-bars by removing this bolt $h$, so that if it should be desired to convert the machine into a cultivator or other implement the seed-distributing portion may be removed in the manner thus described and a tool-supporting frame secured to the wheel-supporting frame.

Having thus described my invention, what I claim, and desire to secure by Letters Patent, is—

1. In a seed-distributing machine, the combination of a main supporting-frame, feeding and dropping mechanism carried thereby, means for actuating said feeding and dropping mechanism, an auxiliary frame pivoted to the rear of the main frame, adapted to drop by gravity when the main frame is raised, and mechanism connected to and actuated by the dropping of the auxiliary frame for stopping the feeding and dropping mechanism, substantially as described.

2. In a seed-distributing machine, the combination of a main supporting-frame adapted to support the seed-hopper and dropping mechanism, a horizontally-disposed shaft for actuating the feeding and dropping mechanism, gearing connecting said shaft with the driving-wheel of the machine, an auxiliary frame pivoted to the rear of the main frame adapted to drop by gravity when the main frame is raised, and mechanism connected to and actuated by the dropping of the auxiliary frame for automatically disconnecting said gearing, substantially as described.

3. In a seed-distributing machine, the combination with the hopper-frame, of a longitudinal shaft for actuating the feeding and dropping mechanism, a gear feathered to the forward end of said shaft adapted to slide thereon, a driving-gear carried by the supporting-wheel of the machine adapted to mesh with the smaller gear for actuating the longitudinal shaft, a loosely-pivoted roller-frame hinged to the rear of the machine adapted to drop by gravity when the hopper-frame is raised, and a rod connecting the said pivoted frame with the sliding gear for automatically disconnecting the gearing as the roller-frame is dropped, substantially as described, and for the purpose stated.

4. In a seed-distributing machine, the combination of the hopper-frame, a longitudinal shaft for operating the feeding and dropping mechanism, a gear loosely mounted on one end of said shaft feathered thereto so as to revolve therewith, a driving-gear carried by the supporting-wheel of the machine adapted to mesh with the loosely-mounted gear, a sleeve loosely mounted on the longitudinal shaft, projections formed on the sliding gear adapted to embrace the said sleeve, a loosely-pivoted roller-frame carried by the main frame of the machine adapted to drop by gravity when the main frame is raised, and a rod connecting said pivoted frame with the loose sleeve carried by the longitudinal shaft for disconnecting the gearing as the roller-frame is dropped, substantially as described.

5. The combination of the hopper-frame, a longitudinal shaft, E, for operating the feeding and dropping mechanism, a support, $g$, for the forward end of said shaft, a gear, J, carried by the supporting-wheel of the machine, a gear, I, loosely mounted on the shaft, E, a key, $i$, for said gear, a sleeve, $e$, loosely mounted on said shaft having a flange, $e'$, hooked projections, $f$, embracing the said flange, $e'$, a pivoted frame, K, having an arm, $k$, and a rod, M, secured to the arm, $k$, at one end and to the sleeve, $e$, at its forward end, substantially as described.

6. In a seed-distributer, the combination of a seed-hopper, a feed-cylinder located in the lower end of said hopper open at its sides, an opening provided in the lower portion of the feed-cylinder, a circular spring-band adapted to embrace and partly surround the said feed-cylinder and be held thereto by its own elasticity, means for limiting the movement of the said band, an indicating-plate located on the outside of the hopper-frame, a pivoted index-finger for said indicating-plate, means for securing the said finger in a fixed position and a connection between the index-finger and the spring-band, substantially as described.

7. In a seed-distributer the combination of the seed-hopper, a feed-cylinder located in the lower end of said hopper open at its sides, an opening provided in the lower portion of the feed-cylinder, a spring-band adapted to embrace and partly surround the said feed-cylinder, a rib or projection formed on the feed-cylinder for limiting the movement of the spring-band, an indicating-plate located on the outside of the hopper-frame, a pivoted index-finger for said indicating-plate, and a link connection between the index-finger and the spring-band whereby upon the adjustment of the said index-finger the band is moved around the feed-cylinder to regulate the area of the discharge-opening, substantially as described.

8. The combination with the hopper of the cylindrical ring, C, located in the apex of the hopper, an opening, $c'$, provided in the lower portion of said ring, a band, N, partly embracing the ring, C, means for limiting the sliding movement of said band, an index-segment, O, located on one side of the hopper-frame, a slot, $o'$, formed therein, a pivoted crank-arm, O', having a pointer on its upper end adapted to bear against the index-plate, a set-screw, $o^2$, passing through the pointer-arm and through the slot, $o'$, a thumb-screw, $o^3$, for clamping the index-finger in its position, and a link, $p^2$, connecting the end of the crank-arm, O', with the sliding band, N, substantially as and for the purpose stated.

9. In a seed-distributing machine, the combination with the hopper supported by the main frame of the machine, feeding and dropping mechanism for said hopper, a rear frame pivoted to the main frame adapted to drop by gravity as the hopper-frame is raised, and a shutter for closing the discharge-opening of the hopper actuated by the dropping of the rear pivoted frame, substantially as described.

10. In a seed-distributing machine, the combination with the hopper, of mechanism connected with the supporting-wheel of the machine for actuating the feeding and dropping mechanism, a rear-frame pivotally connected to the hopper-frame adapted to drop by gravity when said hopper-frame is raised, and mechanism actuated by the dropping of the rear frame for disconnecting the feeding mechanism and for simultaneously operating a cut-off for closing the discharge-opening of the hopper, substantially as described.

11. In a seed-distributing machine, the combination with the main supporting-frame adapted to support the seed-hopper and its dropping mechanism, a horizontally-disposed shaft geared to the driving-wheel for actuating the feeding and dropping mechanism, an auxiliary frame pivoted to the rear of the main frame adapted to drop by gravity as the main frame is raised, means actuated by the dropping of the rear frame for disconnecting the driving mechanism and simultaneously operating a cut-off for closing the discharge-opening in the hopper, substantially as described.

12. The combination with the hopper having a discharge-opening in its bottom, a feeding mechanism located above the same, a longitudinal shaft for actuating the said feeding mechanism, a sliding gear carried by said shaft adapted to mesh with a gear on the supporting-wheel, a roller-frame pivoted to the main frame adapted to drop by gravity as the main frame is raised, connections between the sliding gear and the pivoted rear frame, a sliding gate adapted to close the discharge-opening in the seed-hopper, and a connection between the sliding gear and the said gate for operating the same as the hopper-frame is elevated and the rear frame dropped, substantially as described.

13. The combination with the hopper having a discharge-opening in its bottom, a feeding mechanism located above the same, a longitudinal shaft, E, for actuating the feeding mechanism, a gear, I, feathered to said shaft and adapted to mesh with a gear, J, carried by the main supporting-wheel, a sleeve, $e$, carried by said shaft, projecting lips, $f$, formed on the gear, I, adapted to engage the said sleeve, $e$, a pivoted frame, K, a connecting-rod between said frame and the sleeve, $e$, a slide, L, adapted to enter the hopper-frame below the seed-opening, and a rod, L', connecting the said slide and the sleeve, $e$, substantially as and for the purpose stated.

14. The combination with the hopper having a discharge-chute, a shutter adapted to close said chute, a lever, T, connected to the shutter, a coil-spring, $t$, connected to the lever, T, and to the frame of the machine, means for automatically actuating the lever, T, to operate the shutter intermittently, a bracket-arm, U, for guiding and supporting the lever, T, having outwardly-projecting arms, a notch or recess formed in one of said arms, and a recess, $t^2$, formed in the edge of the lever, T, adapted to engage the recess in the bracket-arm when the lever, T, is elevated, substantially as described.

15. The combination with the hopper having a discharge-chute, a shutter adapted to close the said chute, a lever, T, connected to the shutter, a projecting lug, $t'$, provided on the lever, a rib, $t^3$, a notch, $t^2$, in the edge of the lever, T, a bracket, U, having an arm, $u$, and an arm, $u'$, adapted to embrace the edge of the rib, $t^3$, during the normal position of the lever, T, and to abut against the side of said rib when the notch, $t^2$, is in engagement with the arm, $u$, substantially as described.

In witness whereof I have hereunto set my hand this 30th day of June, A. D. 1899.

SAML. L. ALLEN.

Witnesses:
 LEWIS H. VAN DUSEN,
 HORACE PETTIT.